March 5, 1946.　　　　A. BERTEA　　　　2,395,953
FLUID SEAL
Filed July 17, 1943
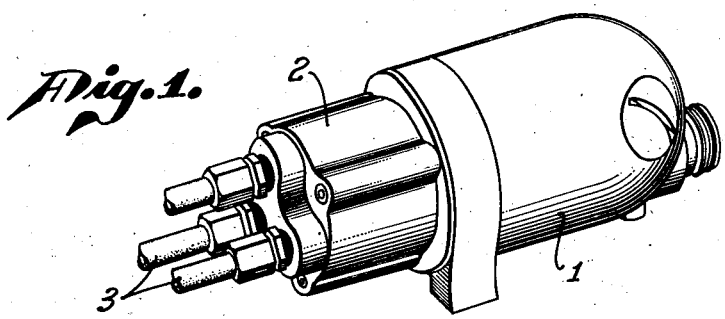
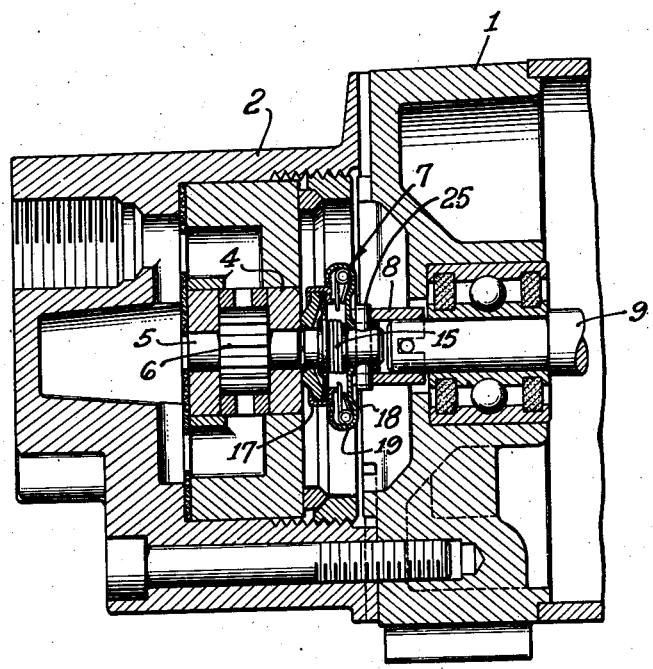
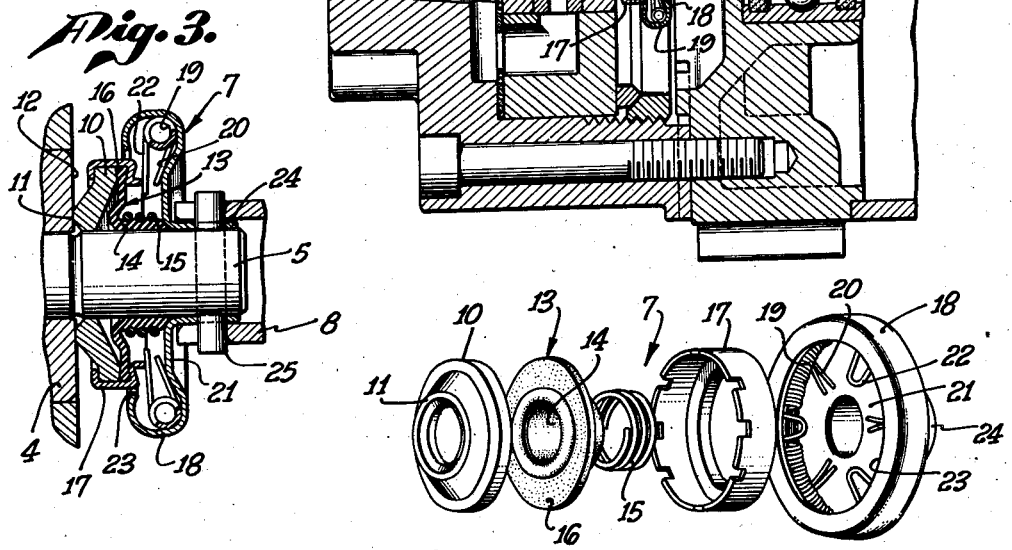
INVENTOR.
ALEX BERTEA,
BY
ATTORNEY.

Patented Mar. 5, 1946

2,395,953

UNITED STATES PATENT OFFICE 2,395,953

FLUID SEAL

Alex Bertea, Pasadena, Calif., assignor to Adel Precision Products Corp., Burbank, Calif., a corporation of California Application July 17, 1943, Serial No. 495,166

1 Claim. (Cl. 286—11)

My invention relates to a seal and has particular reference to a fluid seal for rotating shafts which finds particular utility when used on centrifugal pumps and like mechanisms.

In fluid pressure devices, such as rotors or centrifugal pumps, distributing valves and the like, it is necessary to establish a fluid seal between the rotating shaft and the housing of the device. Prior to my invention this seal was established by means of a packing gland which included a packing or sealing material clamped by a gland member against the housing of the pump or device in such manner as to force the same into engagement with the rotating shaft.

Packing glands embody certain disadvantages, particularly when used on rotating shafts. One of the principal disadvantages lies in the fact that the packing gland must be continually adjusted in order to maintain the required fluid seal without producing too much friction between the packing material and the shaft. If the packing gland is too tight, it will heat up and the shaft will, in all probability, be scored and the fluid seal destroyed. If the packing is too loose, the gland will leak. If the packing is improperly adjusted the wear on the packing material will shortly result in fluid leaking past the packing gland.

Another of the disadvantages with the conventional packing gland construction is that the shaft forms one of the wearing surfaces. As the shaft wears it becomes roughened and the rate of wear increases rapidly. Soon the shaft must be replaced in order to permit a fluid seal to be maintained. Replacement of the shafts in centrifugal pumps and like devices is an expensive and time consuming operation.

It is an object of the present invention to overcome the above noted disadvantages by providing a fluid seal for rotating shafts which revolves with the shaft and in which the wearing surfaces are between the sealing structure and the housing of the fluid pressure device or pump.

It is also an object of my invention to provide a seal of the character referred to in the preceding paragraph which includes a means for automatically taking up any wear of the packing material or the surface against which the packing material bears.

It is an additional object of my invention to provide a fluid seal for rotating shafts which includes a ring member surrounding the shaft and rotating therewith which bears against the housing of the pump or fluid device, the fluid seal being established between such housing and rotating ring.

It is a still further object of my invention to provide a fluid seal of the character set forth in the preceding paragraph which includes a means for continuously urging the sealing ring into engagement with the housing and which includes a flexible means for establishing a rotating fluid seal between the ring and the shaft.

Other objects and advantages of my invention will be apparent from a study of the following specification, read in connection with the accompanying drawing, wherein:

Fig. 1 is a perspective view of a rotary pump such as is used on aircraft for supplying de-icing fluid to the wings and propellers of the aircraft, a pump with which my fluid seal is particularly adapted for use;

Fig. 2 is a longitudinal sectional view through the pump portion of the assembly shown in Fig. 1 and illustrating the manner of installation of the fluid seal of my invention;

Fig. 3 is a sectional view comprising an enlargement of a portion of Fig. 2 and illustrating the details of construction of the fluid seal; and Fig. 4 is an exploded perspective view illustrating in detail the appearance and construction of the component parts of my fluid seal.

Referring to the drawing, I have illustrated in Fig. 1 as an example of the type of equipment with which the fluid seal of my invention is particularly adapted for use with a de-icing pump of the type commonly used on aircraft. The pump illustrated comprises an electric motor 1 to the housing of which is affixed a pump 2, the housing of which is fitted with suitable accessories for accommodating fluid lines 3 for drawing de-icing fluid from a source of supply and distributing the same under pressure to points on the wing surfaces and the propeller hub where the de-icing fluid is to be applied.

The pump 2 is shown in section in Fig. 2 as including the main pump housing 2 within which is mounted a smaller stationary inset pump housing 4. The housing 4 supports a shaft 5 upon which is mounted a rotor or impeller assembly 6. The shaft 5 passes through a suitable opening in the housing 4 and carries on its inward end a sealing assembly indicated generally at 7 and comprising the subject of the present invention. The innermost end of the shaft 5 is connected as by means of a pin and sleeve type coupling 8 to the shaft 9 of the motor 1.

The sealing assembly 7 is illustrated in detail in Figs. 3 and 4 as comprising a wear ring 10 which is carried by the shaft 5. The ring 10 is preferably cup-like in form as illustrated in Fig. 3 to define a wearing surface 11 which bears against the inward face 12 of the housing 4. It is along the wearing surface 11 that the fluid seal between the shaft 5 and the housing 4 is established. The wear ring 10 is preferably made of a softer and less wear-resistant material than is the housing 4 so that as the parts wear the wear will be concentrated in the replaceable ring 10 rather than in the relatively irreplaceable housing 4. By preference the wear ring 10 is made of a self-lubricating material such as one of the well known self-lubricating bearing metals or one of the graphitic alloys.

The ring 10 is secured to an inner sealing member 13 which is employed to establish the seal between the ring 10 and the shaft 5. The member 13 includes a cylindrical tubular portion 14 which closely embraces the shaft 5 and is securely clamped thereto as by means of a spiral wrapping 15 of wire or other suitable material.

In addition to the tubular portion 15, the sealing ring 13 includes a radially extending flange portion 16 which abuts the outer edge of the wear ring 10 and is securely fastened thereto as by means of a circular clamping ring 17. The ring 17 is preferably formed with a channel-shaped cross section as is best illustrated in Fig. 3 and is used to secure the flange portion 16 to the wear ring 10, this securing being accomplished by crimping the legs of the channel-shaped cross section so as to clamp the edge of the wear ring 10 and the edge of the flange portion 16 between the legs of the channel shape.

The flange portion 16 of the sealing ring 13, in addition to providing a fluid seal between the ring 10 and the shaft 5, serves also to permit longitudinal movement of the ring 10 relative to the shaft 5 to take up for wear occurring at the wearing surface 11. To provide for an automatic take up for such wear and to insure adequate sealing pressure at the surface 11, I employ a spring mechanism for continually urging the ring 10 against the housing 4 to the left as viewed in Fig. 3. This assembly includes an auxiliary housing 18 within which is mounted a series of torsion springs 19. One end 20 of each of the torsion springs bears against a radially disposed back 21 of the housing 18 while the other ends 22 of the springs 19 bear against the inner leg of the channel-shaped cross section of the mounting ring 17.

The housing 18 preferably defines an annular opening 23 for receiving the mounting ring 17. The radial face 21 of the housing is preferably formed integrally with the tubular portion 24 which extends inwardly along the shaft 5 to be attached thereto by means of a pin 25 forming a part of the pin and sleeve coupling 8. The pin 25 thus serves to hold the spring housing 18 immovably with respect to the shaft 5 so that the springs 19 may continually urge the wear ring 10 against the face 12 of the housing 4.

From the foregoing it will be seen that the sealing mechanism just described serves to maintain a fluid seal between the shaft 5 and the housing 4 of the pump, this seal being established at the housing by the wear ring 10 and along the shaft by the sealing ring 13. The ring 13 may be made of rubber, leather or other flexible fluid-tight material, a preference being expressed for one of the synthetic rubbers such as "neoprene" when resilience and resistance to oil and petroleum fluids is required.

The spring mechanism employed serves to continually take up for any wear that may occur and operates to maintain an adequate sealing pressure at all times without imposing undesirably high thrust forces on the shaft 5 and without requiring any movement of the shaft 5 to take up the wear at the sealing surface. Any wear that does occur is concentrated in the replaceable sealing ring 10.

While I have shown and described the preferred embodiment of my invention, I do not desire to be limited to any of the details of construction shown or described herein, except as defined in the appended claim.

I claim:

A device for establishing a fluid seal between a rotating shaft and a stationary member encircling said shaft, comprising: a wear ring defining an annular sealing surface engaging said member; a flexible diaphragm encircling said shaft; means securing said diaphragm to said shaft for rotation therewith and establishing a fluid seal between said diaphragm and said shaft; means securing the outer edge of said diaphragm to the outer edge of said ring and establishing a fluid seal therebetween; a housing defining a toroidal cavity; and a plurality of torsion springs in said cavity, one end of each of said springs bearing against said housing and the other end of each of said springs bearing against said ring, said springs being stressed in torsion to produce a force normally urging said ring into engagement with said member.

ALEX BERTEA.